(12) United States Patent  (10) Patent No.: US 7,610,975 B1
Gust et al.                (45) Date of Patent: Nov. 3, 2009

(54) ELECTRIC DRIVE RIDING MOWER (75) Inventors: Jackie R. Gust, Apple Valley, MN (US); Eric A. Metheny, Woodbury, MN (US); Dana R. Lonn, Minneapolis, MN (US); Heinrich F. Tetzlaff, Apple Valley, MN (US); Dennis J. Pavlik, Eagan, MN (US); Mark S. Anderson, Prior Lake, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 09/480,044

(22) Filed: Jan. 10, 2000

Related U.S. Application Data (63) Continuation of application No. 09/142,392, filed as application No. PCT/US97/01853 on Feb. 7, 1997, now abandoned.

(60) Provisional application No. 60/011,450, filed on Feb. 9, 1996.

(51) Int. Cl.
    *B60K 6/46* (2007.10)

(52) U.S. Cl. .................... 180/65.245; 56/10.6; 903/930

(58) Field of Classification Search ............... 180/65.4, 180/65.8, 65.2; 56/13.3, 11.9, 10.6; 903/930
    See application file for complete search history.

(56) References Cited

U.S. PATENT DOCUMENTS

| 1,790,635 | A | * | 1/1931 | Arendt ..................... 180/65.4 |
| 2,057,417 | A | | 10/1936 | Clapper |
| 3,719,881 | A | * | 3/1973 | Shibata et al. ............. 180/65.4 |
| 4,113,045 | A | | 9/1978 | Downing, Jr. |
| 4,196,785 | A | * | 4/1980 | Downing, Jr. .............. 180/6.28 |
| 4,443,997 | A | * | 4/1984 | Namdari ..................... 56/13.3 |
| 4,870,811 | A | * | 10/1989 | Steele ........................ 56/10.5 |
| 4,964,265 | A | | 10/1990 | Young |
| 4,968,941 | A | * | 11/1990 | Rogers ....................... 324/428 |
| 5,356,238 | A | * | 10/1994 | Musil et al. ................ 404/84.1 |
| 5,588,498 | A | * | 12/1996 | Kitada ........................ 180/65.8 |
| 5,656,919 | A | * | 8/1997 | Proctor et al. ............... 320/153 |

(Continued)

FOREIGN PATENT DOCUMENTS

JP            4-166475          6/1992

OTHER PUBLICATIONS

Unique Mobility/Toro prototype mower.

*Primary Examiner*—Frank B Vanaman
(74) *Attorney, Agent, or Firm*—James W. Miller (57) ABSTRACT

An electric drive mower includes an electric traction drive as well as electric drive to the cutting units carried on the mower. A hybrid electric drive system supplies electric power to these motors. The electric drive system includes a genset (an internal combustion engine driving an electrical power generating device such as an alternator) and a battery pack which supply the electric power to the electric motors either individually or jointly. A switch may be provided to permit all battery operation of the mower. A steering system having a non-powered pump is used to effect steering of the steerable wheel(s) of the mower to avoid having a heated oil damage the turf in the event of a leak. A crankshaft driven by a single electric drive motor is linked to all the cutting units through various crankarm and connecting rod linkages to lift and lower the cutting units in a timed manner.

10 Claims, 8 Drawing Sheets

U.S. PATENT DOCUMENTS 5,667,029 A * 9/1997 Urban et al. ............... 180/65.2
5,790,355 A * 8/1998 Ishmael ..................... 361/27
5,794,422 A * 8/1998 Reimers et al. ............. 56/11.9

* cited by examiner

ELECTRIC DRIVE RIDING MOWER

This application is a continuation of application Ser. No. 09/142,392, filed Jun. 8, 1998, now abandoned which is an application under 35 USC 371 of International Application number (PCT/US97/01853, filed Feb. 7, 1997, which claims the benefit of provisional application No. 60/011,450, filed Feb. 9, 1996.

TECHNICAL FIELD

This invention relates to a hybrid internal combustion engine/electric drive system for turf maintenance vehicles such as riding mowers, to a steering system for such vehicles, and to a lift and lower system for the turf maintenance operating units, such as cutting units, carried on such vehicles.

BACKGROUND OF THE INVENTION

U.S. Pat. No. 2,057,417 to Clapper, assigned to the assignee of this invention, discloses a riding mower having electrically driven cutting reels. An internal combustion engine drives a generator which supplies the electrical current for operating the electric motors that power the cutting reels. However, the drive wheels of the mower are mechanically driven from the engine. Accordingly, the engine must be continuously operated to drive the vehicle, which is undesirable in certain circumstances because of the noise and/or pollution generated by the engine.

U.S. Pat. No. 5,406,778 to Lamb et al. shows a riding mower in which the cutting reels and the traction drive are both electrically operated from batteries carried on the mower. There is no internal combustion engine provided on the mower, the only source of power being the batteries. While the mower is quiet during operation, it has limited range and usefulness due to the battery power source. This is particularly true because of the large energy drain imposed on the batteries to operate the traction drive.

Neither of the riding mowers disclosed in these patents is as effective as is desired for meeting the need for a quiet mower having adequate range and usefulness. The Clapper mower requires the use of an internal combustion engine sized sufficiently large to meet the peak horsepower needs of the mower, as when the mower is being driven at relatively high speed up a hill. Thus, the relatively large engine on the Clapper device generates a high level of undesirable noise. While the Lamb et al. mower may be quiet, it must be frequently recharged, limiting its usefulness.

SUMMARY OF THE INVENTION

One aspect of this invention is to provide a turf maintenance machine which includes a frame. A plurality of ground engaging wheels are attached to the frame for supporting the frame for movement over the ground. At least one electric motor is operatively connected to at least one of the ground engaging wheels for propelling the wheel to provide traction for the frame. At least one operating unit is carried on the frame for performing a turf maintenance operation. At least one electric motor is operatively connected to at least one operating unit for powering the operating unit. Finally, an electric drive system is carried on the frame for providing electric power to the electric motors. The electric drive system comprises an internal combustion engine, an electric power generating device mechanically driven by the engine for supplying electric power, a battery power source for supplying electric power; and means for connecting the electric motors to the electric power generating device and to the battery power source to allow electric power to be supplied to the electric motors from either or both of the electric power generating device and battery power source.

Another aspect of this invention relates to a turf maintenance machine which includes a frame. A plurality of ground engaging wheels are attached to the frame for supporting the frame for movement over the ground, wherein at least one of the wheels is steerable to allow the frame to be turned. A steering system for steering the steerable wheel is provided, which comprises at least one steering control adapted to be selectively moved by a user of the machine, a pump operatively connected to the steering control such that movement of the steering control serves as a motive force for pumping a fluid out of one side or the other of the pump as the user operates the steering control, and a cylinder having a piston mechanically linked to the steerable wheel, the cylinder being fluidically coupled to the pump such that fluid flow from the pump acts on the piston to cause the piston to move in and out of the cylinder to thereby steer the steerable wheel.

A third aspect of this invention relates to a turf maintenance machine which includes a frame. A plurality of ground engaging wheels are attached to the frame for supporting the frame for movement over the ground. A plurality of operating units are carried on the frame for performing a turf maintenance operation. A lift and lower system is carried on the frame for raising and lowering the operating units, wherein the lift and lower system comprises a rotatable crankshaft, a plurality of crankarm and connecting rod linkages for connecting each of the operating units to the crankshaft, and means for rotating the crankshaft such that rotation of the crankshaft in a first increment of rotation raises the operating units and rotation of the crankshaft in a second increment of rotation lowers the operating units.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
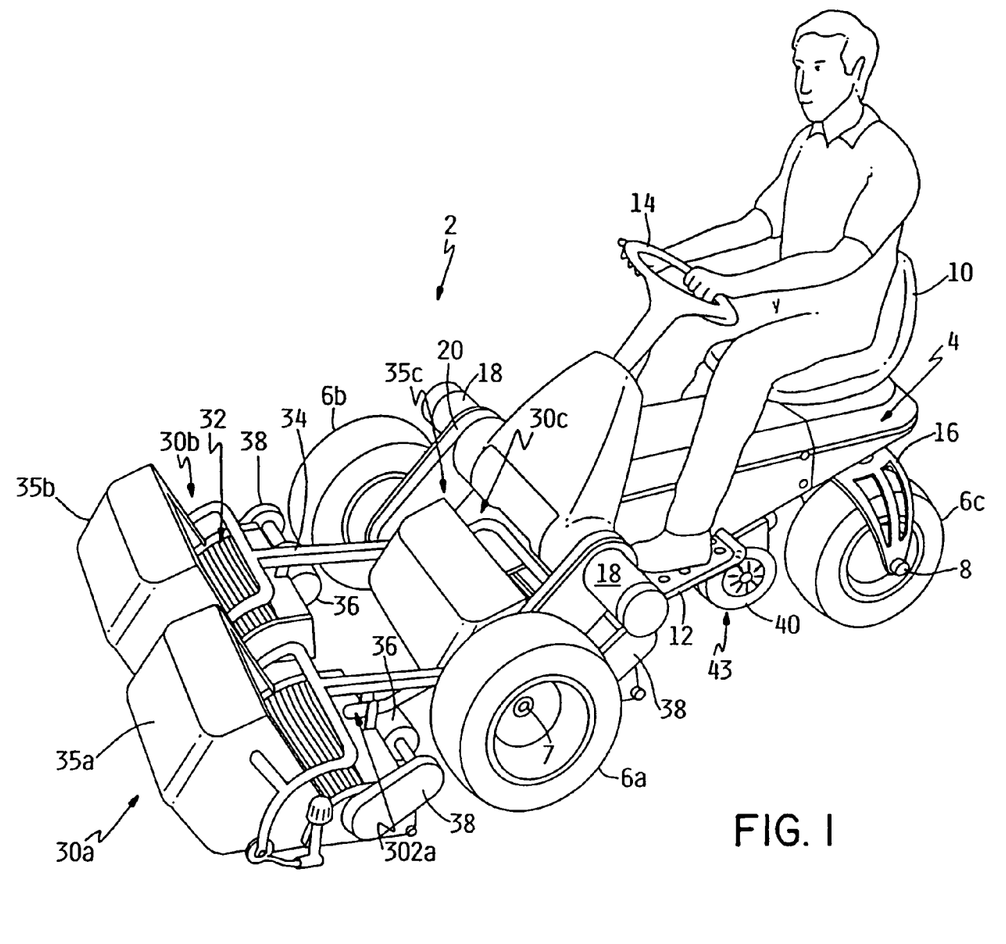
FIG. 1 is a perspective view of a typical riding turf maintenance vehicle to which the drive system of this invention is applied, such vehicle comprising a riding greens mower.
Figure 2:
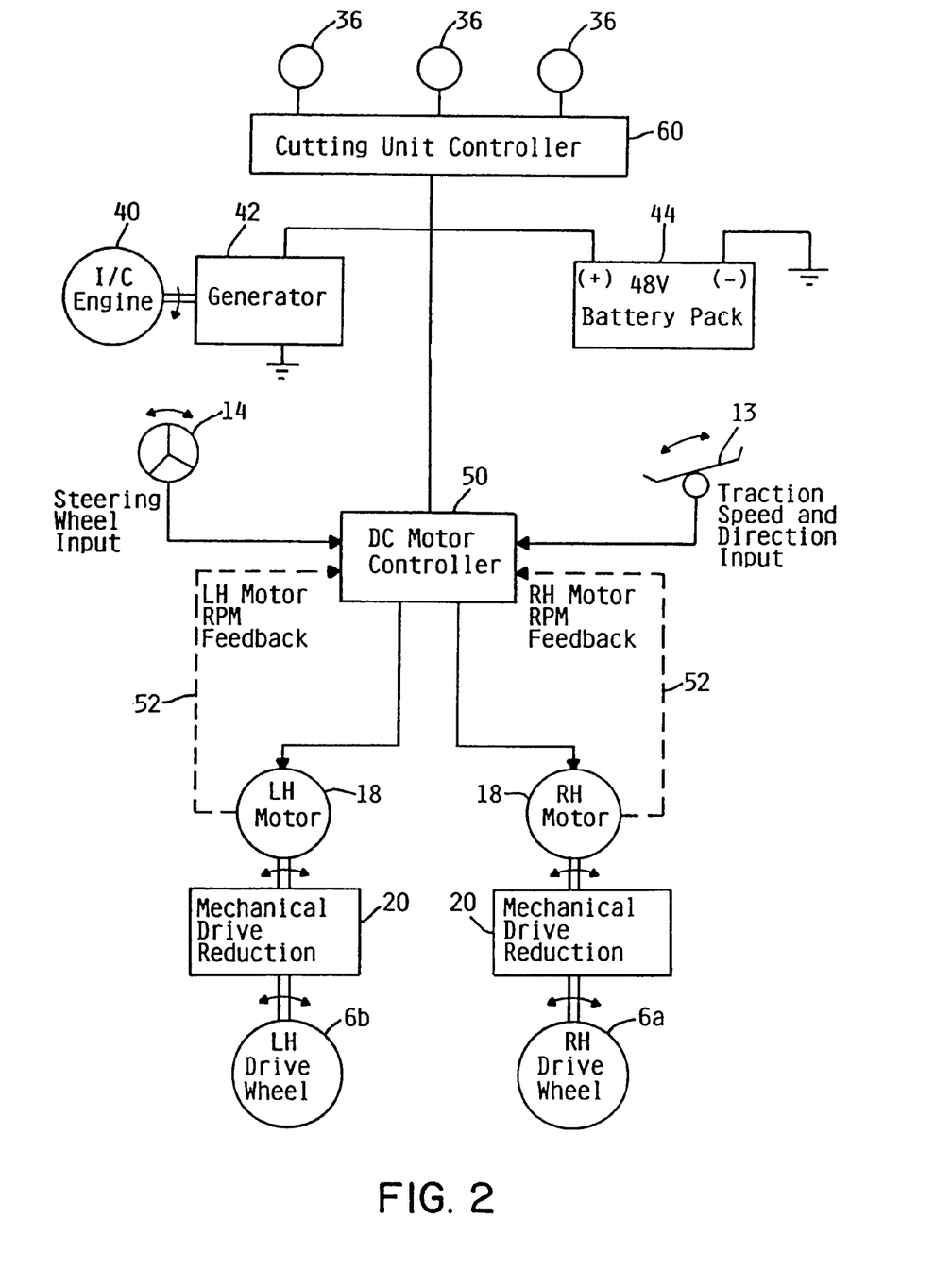
FIG. 2 is a block diagram of a first embodiment of a drive system according to this invention applied to the turf maintenance vehicle of FIG. 1.

The Mower and Drive System of FIGS. 1 and 2

This invention relates to a self-propelled lawn mower having an electric drive for powering the drive or traction wheels as well as powering the cutting unit(s) carried on the lawn mower.

Referring to FIG. 1, which is a perspective view of a mower 2 according to this invention, mower 2 includes a frame 4 which carries a plurality of ground engaging wheels 6 for allowing frame 4 to traverse over the ground. In that version of mower 2 shown in FIG. 1, wheels 6 are arranged in a tricycle configuration, with two wheels 6a and 6b being arranged at a forward portion of frame 4 and a single wheel 6c being arranged at a rearward portion of frame 4. Front wheels 6a and 6b are rotatably carried on frame 4 by stub axles 7 while rear wheel 6c is rotatably carried on a pivotal yoke 16 by a through axle 8.

Frame 4 carries an operator seat 10 for allowing an operator to ride on mower 2. Foot rests 12 are provided on frame 4 for the operator's feet. A treadle type traction pedal 13 can be provided on one foot rest 12 for allowing the speed and direction of movement of frame 4 to be controlled by the operator, e.g. stepping on the front of the pedal obtains forward motion of frame 4 and stepping on the rear of pedal obtains reverse motion of frame 4. Traction pedal 13 is shown in FIG. 2. A brake pedal (not shown in FIG. 1) can be provided on one of the foot rests for allowing the operator to stop the movement of frame 4 using any conventional braking system. Other conventional controls can also be provided, e.g. a control for starting and stopping the cutting units, a control for raising the cutting units off the ground, a parking brake, etc.

A steering wheel 14 is provided on frame 4 which the operator can grip and turn to guide the movement of mower 2. Steering wheel 14 is preferably linked by any conventional steering linkage or system (e.g. a mechanical or hydraulic steering system) to a yoke 16 which carries rear wheel 6c with yoke 16 being rotatable on frame 4 about a generally vertical axis. Thus, operation of steering wheel 14 rotates rear wheel 6c about the vertical axis of yoke 16 to steer mower 2.

Front wheels 6a and 6b comprise the drive or traction wheels that are used to propel the frame in forward and reverse directions. Separate electric drive motors 18, one for each wheel 6a and 6b, are carried on frame 4 and are linked to each wheel 6a and 6b through a mechanical drive reduction 20 of any known type. Thus, each front drive wheel 6a and 6b is independently driven by its own separate electric drive motor 18 and mechanical drive reduction 20 (e.g. a 30:1 chain or gear reduction drive). Drive motors 18 for drive wheels 6a and 6b can comprise General Electric BC58 series wound DC electric motors that develop 1.5 HP at 4200 RPM.

A plurality of cutting units 30 are carried on frame 4. In the version of mower 2 illustrated in FIG. 1, such cutting units are arranged in a triplex configuration of the type often used in riding greens mowers. Two cutting units 30a and 30b are arranged forwardly of frame 4 in advance of front wheels 6a and 6b. A third cutting unit 30c is also arranged at the forward portion of frame 4 to be located generally between front wheels 6a and 6b. Thus, easy access can be had to the grass collection baskets 35 of cutting units 30a-30c without having to make special provision for gaining access to the basket 35c of third cutting unit 30c. Such basket 35c can simply be lifted up for dumping similarly to the baskets 35a and 35b on the front cutting units 30a and 30b.

Each of the cutting units 30a-30c as shown herein preferably comprise reel type cutting units having a rotatable cutting reel 32 that sweeps grass against a sharpened bedknife (not shown) for cutting. Such cutting units have front and rear rollers (also not shown) that allow the cutting units to rest on and roll over the ground during operation of the cutting units as the cutting units are pushed forwardly by the propulsive force of frame 4. Cutting units 30a-30c are suspended from frame by any suitable suspensions 34 to allow the cutting units to float relative to the ground during operation, and to raise cutting units 30a-30c up above the ground into a raised non-operative position for higher speed transport of frame 4. Each cutting unit 30 includes a grass collection basket 35 releasably carried on the front thereof in any known manner. Basket 35 collects the grass clippings cut by the cutting unit and may be periodically lifted up and removed from the cutting unit for dumping such clippings.

Each cutting unit 30a-30c is also electrically driven. An individual electric motor 36 is carried on the frame of each cutting unit and is operatively connected to the shaft of cutting reel 32 by a mechanical drive reduction 38. Thus, as electric motor 36 rotates, the cutting reel 32 is also rotated but at a slower speed due to the mechanical drive reduction 38 interposed between reel 32 and motor 36. While a drive reduction 38 may be used, a 1:1 drive arrangement may also be used between cutting reel 32 and motor 36 such that reel 32 rotates at the same speed as motor 36. Each cutting unit 30 has its own electric motor 36 and drive reduction 38, though the motor 36 for cutting unit 30c is not visible in FIG. 1 as it is hidden in that view. Motors 36 for cutting reels 32 can comprise Scott Motors 4BB-X835 permanent magnet 48V DC motors that develop ¾ HP at 3000 RPM.

Each cutting unit motor 36 is preferably mounted on the frame of cutting unit 30 at the back thereof. This mounting arrangement is possible due to the drive reduction 38 or other 1:1 drive transmission that connects motor 36 to reel 32. This mounting arrangement is advantageous in that cutting unit 30 is better balanced than if motor 36 were mounted sticking out to one side or the other of the cutting unit. Placing motor 36 on the cutting unit frame between the sides of the cutting unit, and preferably placing such motor 36 about midway between the sides of the cutting unit, does not significantly disturb the cutting unit balance and thus does not affect the quality of cut provided by the cutting unit. In addition, mounting motor 36 in the fashion shown in FIG. 1 and as described herein does not increase the width of mower 2 or interfere with close trimming by mower 2 in which one of the front cutting units 30a or 30b is located close to an obstruction.

Referring now to FIG. 2, which is a block diagram of the drive system for mower 2, an internal combustion engine 40 is carried on frame 4 along with a generator or alternator 42 coupled to the engine 40 for generating electrical power, the engine/generator combination typically being known and referred to as a genset and illustrated herein as genset 43. Engine 40 is coupled only to generator 42. It does not drive the traction wheels 6a and 6b or any of the cutting units 30 directly. Referring to FIG. 1, genset 43 can be mounted to frame 4 in any convenient manner, e.g. by being slung or suspended from beneath frame 4 as shown or being enclosed inside some type of shroud or body that is carried on frame 4. One type of genset 43 that can be used is an Onan Microlite 48V DC genset developing 4000 watts of power with a 9 HP internal combustion engine 40.

A plurality of electrical storage batteries are also carried on frame 4 in a battery pack 44. For example, four 12V lead acid Delco VRLA batteries can be used to provide a 48V DC supply. Battery pack 44 is not shown in FIG. 1, but again is carried on frame 4 in any convenient location. Preferably, battery pack 44 will be enclosed in a shroud or pod that is part of or attached to some portion of frame 4.

In the drive system shown in FIG. 2, the battery pack 44 is connected to generator 42 to allow generator 42 to charge the batteries during operation of engine 40. In addition, the drive motors 36 for cutting units 30 and drive motors 18 for front wheels 6 are wired to generator 42 and battery pack 44 to allow electrical energy to be supplied to the motors 18 and 36 directly from the generator 42, directly from battery pack 44, or from both simultaneously, as needed during the operation of mower 2.

Referring further to FIG. 2, a DC dual motor electronic controller 50 receives inputs from traction pedal 13 and steering wheel 14 to determine how much power (and in what proportion and direction) to send each wheel motor. Thus, for example, input from traction pedal 13 is used to regulate the speed of rotation and direction of rotation of each wheel motor 18. For example, the operator can manipulate traction pedal 13 to signal forward movement in which case the motor controller 50 causes the wheel motors 18 to rotate in a forward direction and at a speed as signalled by the relative position of traction pedal 13. If the operator steps on the back of traction pedal 13 rotating it reversely from neutral, then traction pedal 13 is signalling for reverse movement and the motor controller 50 will reverse the direction of the wheel motors 18 and regulate their speed in accordance with how far back traction pedal 13 is pushed in its reverse direction.

The motor controller 50 also receives an input from steering wheel 14, or from some other portion of the steering system, indicating whether or not a turn is being attempted and the degree of the turn. While steering wheel 14 is linked to the rear wheel yoke 16 to effect turning or steering of mower 2, it is preferable to vary the relative wheel speeds of the front wheel motors 18 during a turn to effect a differential like action and allow the wheel 6a or 6b on the outside of the turn to rotate faster than the wheel 6a or 6b on the inside of the turn. This is done in mower 2 through motor controller 50 which varies the wheel speeds of the individual wheel motors 18 in the right proportion during a turn to effect a differential action during a turn and thereby prevent skidding of the wheels 6a and 6b and the consequent tearing up or destruction of the turf. Preferably, during a turn, the outside wheel 6 is kept rotating at the same speed as before the turn while the inside wheel 6 is slowed by motor controller 2, thus effectively slowing mower 2 down during a turn, to enhance safety and stability of mower 2.

Preferably, a feedback control system is employed in which the actual RPM of the each wheel motor 18 is sensed and reported back to motor controller 50 as indicated by the feedback loops at 52 in FIG. 2. This information is used to ensure that the instantaneous speed of each wheel motor 18 is what it should be to thereby ensure that the wheel motors 18 are turning at the right speeds. However, such feedback loops 52 could be dispensed with if so desired and an "open loop" system used.

Figure 5:
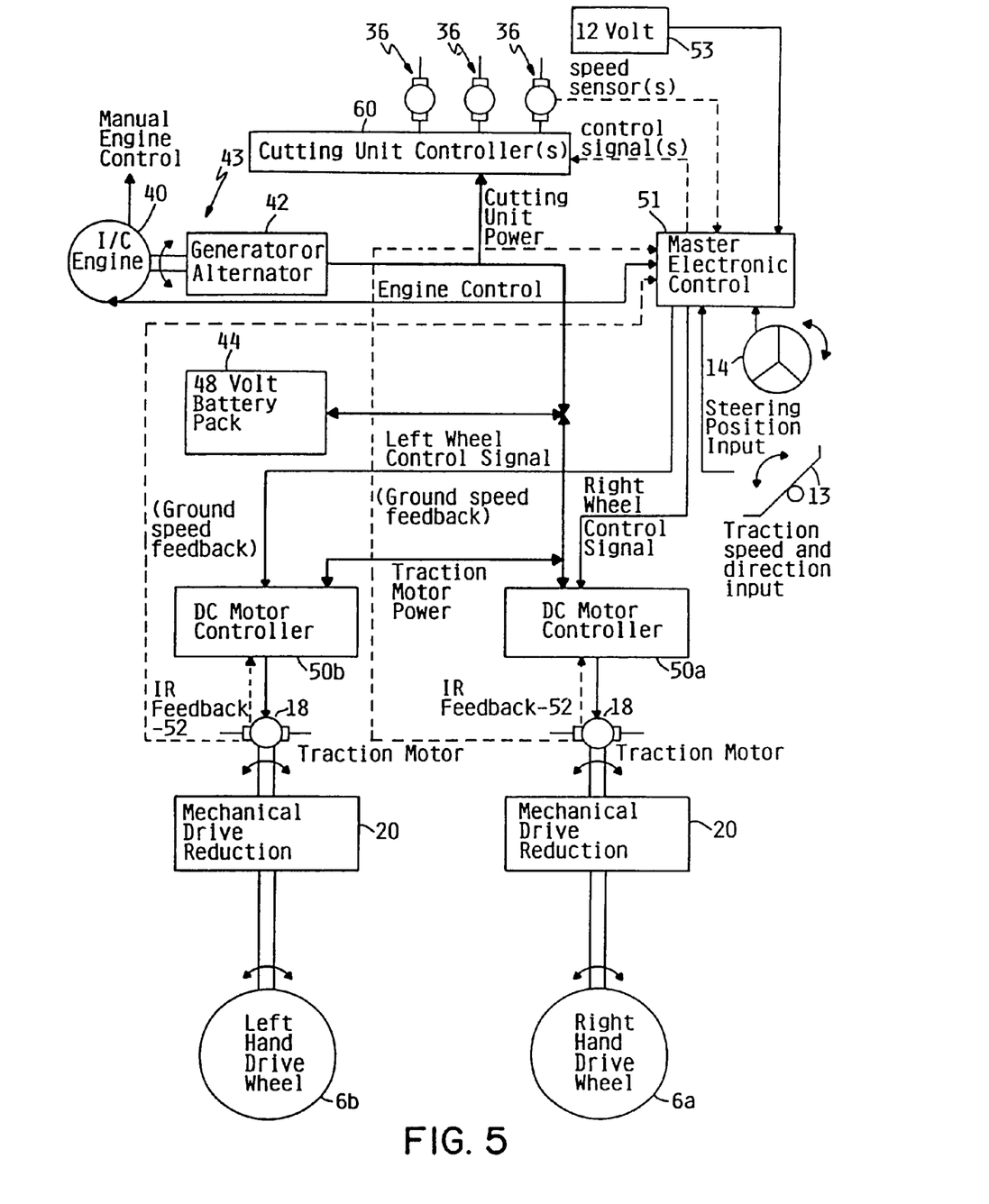
FIG. 5 is a schematic view of a second embodiment of a drive system according to this invention which may be applied to either of the turf maintenance vehicles of FIG. 1 or FIG. 3.

Motor controller 50 can comprise a ZAPI model B1 controller which can be used to control two 48V DC wheel motors 18. Such a controller includes means for effecting the electronic differential action referred to above, is programmable, and also provides for regenerative braking. With such a controller, when the drive wheels 6a and 6b are turning faster than the programmed speed, i.e. when going down a hill, the wheels motors 18 are braked to reduce their speed with the energy derived from such braking being used to recharge battery pack 44. Instead of a single motor controller 50 for controlling both wheel motors 18, a separate motor controller 50 could be used to control only one motor 18 with a microprocessor receiving the input information and coordinating the electrical power distribution. Such a system is shown in FIG. 5 and will be described more fully in conjunction with that figure.

Another electronic controller 60 is used to control the application of electrical power to the cutting unit drive motors 36. Controller 60 can comprise a Curtis Model 1204-1146 48V, 175 Amp electronic controller. This controller can receive an input from the operator to allow the motors 36 to be started and stopped and to allow the speed of the motors 36 to be adjusted up or down. Drive motors 36 could be driven in reverse for backlapping. Moreover, drive motors 36 could be driven at variable speeds during operation, under the control of a programmable microprocessor, to match the instantaneous speed of the reels 32 to the instantaneous forward speed of mower 2 for clip control.

While a single controller 60 has been shown for controlling cutting units 30, in some cases it may be desirable to allow the speed of the motors 36 to be adjusted separately from one another (e.g. the drive motor 36 for cutting unit 30c could be adjusted to rotate at a different speed from the drive motors 36 for the other cutting units). In this case, a separate electronic controller 60 would be used for each motor 36. Moreover, drive motors 36 could be run at a single speed with no electronic controller 60 being used. Instead, an on/off switch or similar control would be used simply to allow the motors 36 to start and stop their operation.

A feature of mower 2 is the use of a genset 43 which is large enough to supply substantially all and preferably slightly more than the average energy needed for operation of mower 2, i.e. for operation of cutting units 30 and for propelling frame 4 over flat terrain and in normal cutting conditions at an average cutting speed. However, genset 43 is preferably made too small to supply all the energy needed during peak energy usage, i.e. when mower 2 is climbing hills, travelling at a high rate of speed, cutting in extremely difficult cutting conditions (long and wet grass), or dethatching or brushing a green. The battery pack 44 then supplies the additional electrical energy that is required to make up the difference between the instantaneous peak usage of mower 2 and the energy output from genset 43 alone.

One advantage of this arrangement is that it allows for a smaller and less costly engine to be used in genset 43 as the engine is not by itself required to have sufficient power for the highest peak energy usage conditions. For example, if a 14-16 HP engine would normally be required, a 6-10 HP engine may now suffice. The engine should be sized to substantially meet and slightly exceed the average energy needs experienced by mower 2 during operation with peak needs then being met by stored energy from the battery pack 44. In addition, even if a larger engine is still used, i.e. the same 14-16 HP engine used on a conventional mower is still used on mower 2, such an engine can be run at much reduced load, e.g. at half speed, which is also much quieter than an engine that must run at full load.

Another advantage of the genset 43/battery pack 44 arrangement is that engine 40 is sized such that the battery pack 44 will often be recharged during the usual operation of the mower 2 and need not await completion of the mowing operation for recharging. Thus, when mower 2 is operating at less than the average energy levels that are then being supplied by genset 43, the excess energy, i.e. the amount by which the genset output is then exceeding the energy draw from mower 2, will flow into and recharge the battery pack 44.

Thus, during normal operation of mower 2, considering that the energy draw from mower 2 will at times be less than the output of genset 43 (i.e. the battery pack 44 is being charged) and at other times may be more than the output of genset 43 (the battery pack 44 is being drained), the mower 2 may well finish a mowing operation with the batteries being more charged, or as well charged, as when the mowing operation began. Thus, in many cases, it would not be necessary to plug the battery pack 44 into a charger, or to plug an onboard charger into an outlet, at the conclusion of a mowing operation. However, it would also obviously be possible to use such a charger to replenish the batteries in the battery pack 44 if they end a mowing session in a drained or depleted condition. Alternatively, one could simply allow engine 40 to run for a period of time with mower 2 sitting in an idle mode to allow genset 43 to recharge battery pack 44.

The genset combination just referred to is one in which the engine 40 runs continuously during operation of mower 2. This is one approach envisioned in the mower 2 of this invention. Because engine 40 is smaller than what would normally be required, it is somewhat easier to enclose and/or muffle such engine so that the noise generated thereby satisfies even stringent conditions. Such a "full time" genset with a small, highly muffled engine 40 could be used even when the extreme quiet of an all electric mower might be preferred.

Another approach envisioned in the mower 2 of this invention is to use a genset 43 in which the engine 40 can be selectively turned off with operation of mower 2 then proceeding only on the basis of the energy stored in the battery pack 44. Some selective control means would be available to the operator for doing this, i.e. the operator would have a switch or button for shutting off genset 43 and going to all electric operation. In this approach, the engine may not have to be as heavily muffled. When extreme quiet is required, the mower 2 could be operated solely from the battery pack 44.

An advantage of this latter described use of a "part time" genset is that there may not be many occasions during which quiet operation of mower is necessary. Thus, genset 43 will be operable most of the time with the engine 40 being run with the consequent advantage of being able to recharge the battery pack 44 during operation. Even when all battery operation is needed, e.g. when mowing greens late at night or early in the morning, such quiet operation may be interspersed with periods when noisy operation is permissible, e.g. during transport from one green to another. Thus, genset 43 can be switched on and off to convert from battery operation alone to operation using both genset 43 and the battery pack with the battery pack 44 then being recharged during the periods of genset operation.

Figure 3:
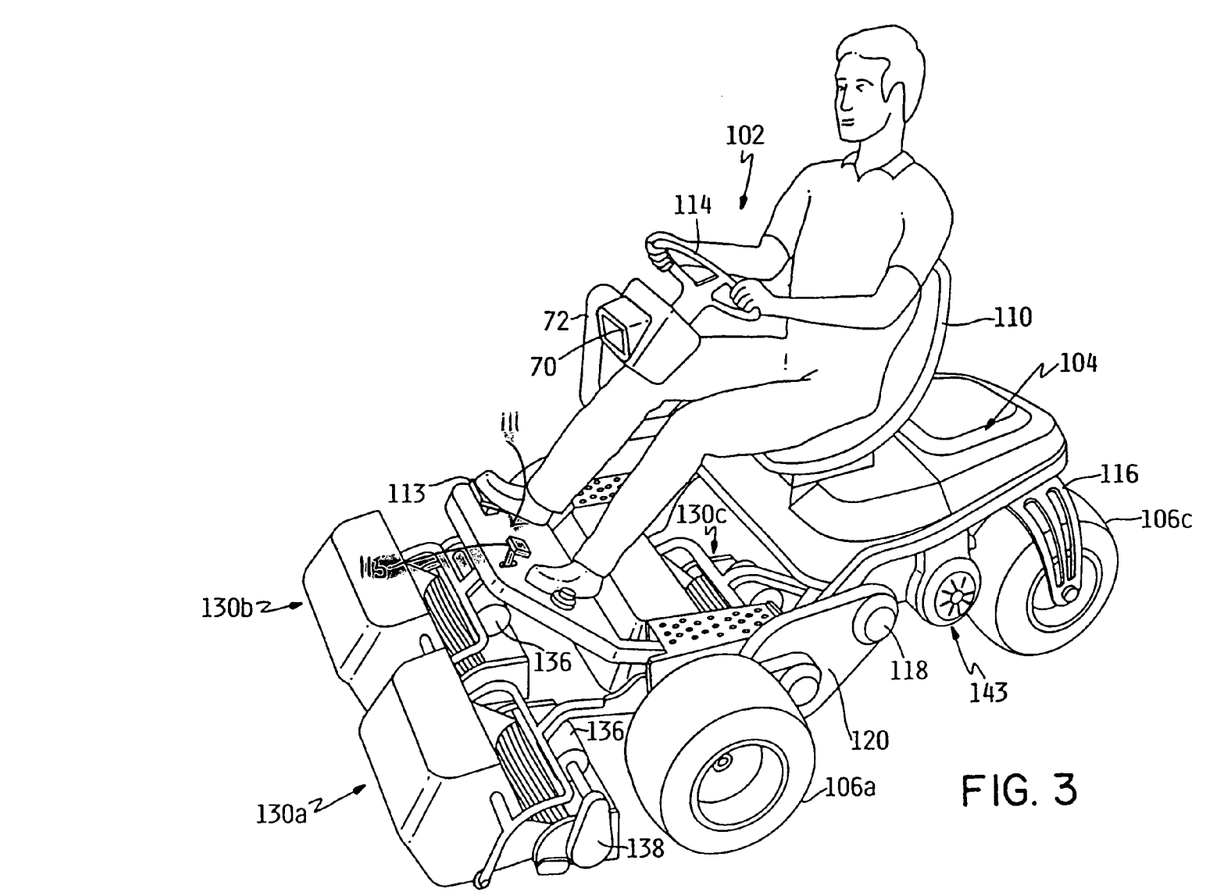
FIG. 3 is a perspective view of a another riding turf maintenance vehicle to which the drive system of this invention is applied, such vehicle also comprising a riding greens mower having a different configuration than the mower shown in FIG. 1.
Figure 4:
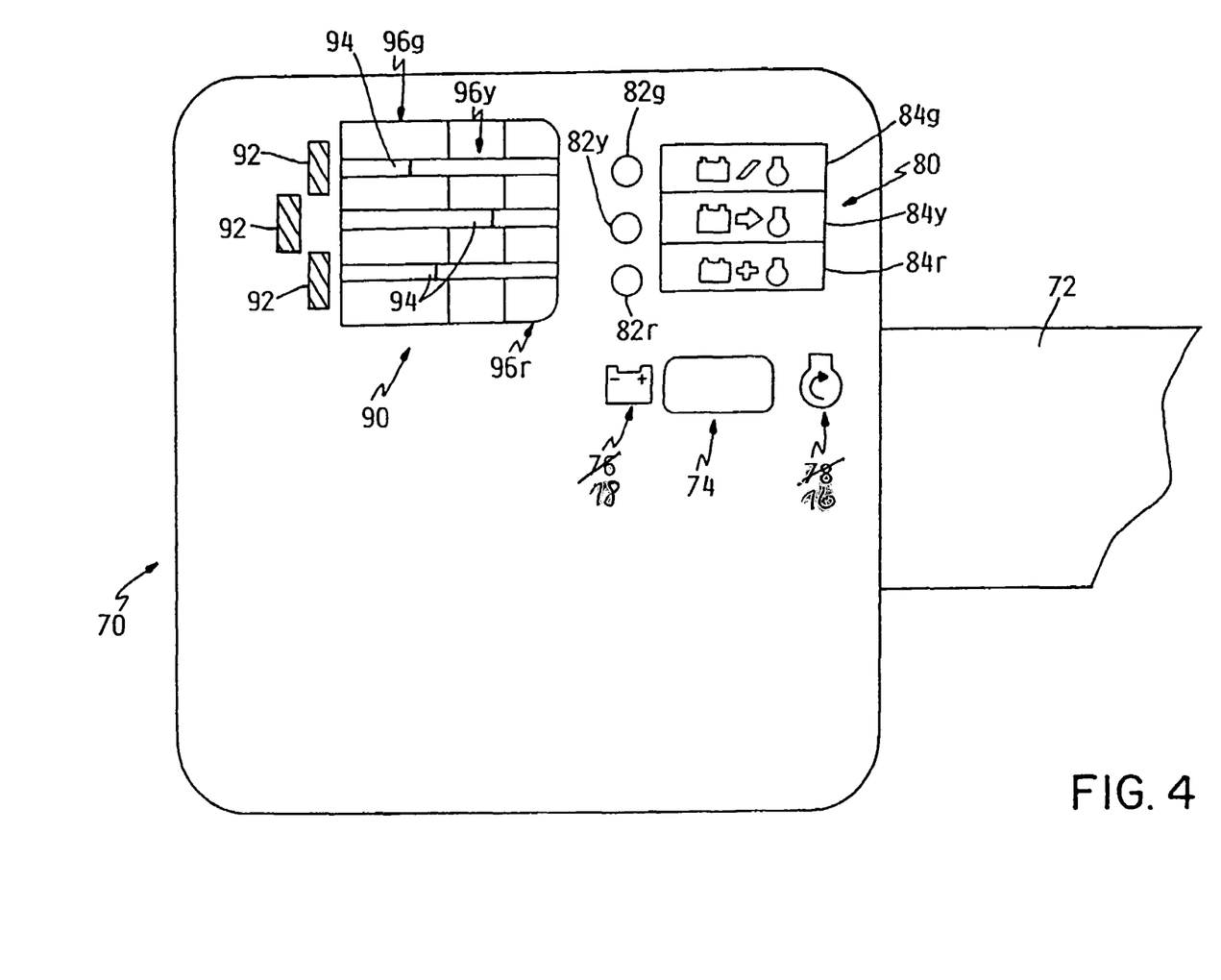
FIG. 4 is a plan view of the front face of a control console used on the vehicle shown in FIG. 3.

The Mower and Control Console of FIGS. 3 and 4

FIG. 3 is a perspective view of another embodiment of a mower 102 according to this invention. FIG. 3 is a mower 102 that is adapted to convert from genset to all battery operation, i.e. a mower having a "part time" genset as described above. FIG. 4 is a top plan view of the face of an energy management control console 170 that is desirably used on such a mower 102.

Mower 102 as shown in FIG. 3 is very similar in most respects to mower 2 shown in FIG. 1. Accordingly, the same reference numerals will be used in mower 102 with a 100 prefix to refer to the same or corresponding parts that were described for mower 2, e.g. mower 102 vs mower 2, frame 104 vs frame 4, etc.

Mower 102 in FIG. 3 has a somewhat differently shaped frame 104 with the operator being seated more forwardly on frame 104. An upwardly inclined floor deck 111 is included mounting traction pedal 113 and a brake pedal 115. A control console 70 rotatably mounts steering wheel 114 and includes various displays and controls to be described. Console 70 is mounted in a cantilevered fashion by a support arm 72 so as to be located in front of the operator as the operator sits on seat 110. The arrangement of wheels 106a-106c, and cutting units 130a-130c, and their manner of being electrically driven, are identical between mowers 2 and 102 with the block diagram of FIG. 2 being applicable to mower 102 to control the components of mower 102 in the same manner that such components are controlled in mower 2. Similarly to mower 2, the individual electric motors 136 that drive cutting units 130a-130c are mounted on the frames of the cutting units, this time on the top of the cutting unit frames rather than on the rear, to allow the cutting units to remain balanced.

Referring now to console 70 shown in FIG. 4 with steering wheel 114 having been removed from console 70 for the purpose of clarity, console 70 includes a rocker arm or switch 74 for selecting genset operation or all battery operation. When switch 74 is depressed towards the symbol 76 representing the internal combustion engine, genset 143 is activated so that energy is available to the electric motors 118 and 136 from both genset 143 and the battery pack 144. Conversely, when switch 74 is depressed towards the symbol 78 representing a battery, genset 143 is deactivated so that energy is available to the electric motors 118 and 136 only from battery pack 144. Accordingly, switch 74 may be selectively manipulated by the operator to switch from one mode of operation to another.

Desirably, console 70 will include some means for reporting the state of charge of the battery pack to the operator to let him know whether it is safe or appropriate to switch from genset operation to all battery operation. This means is indicated generally as 80 in FIG. 4 and comprises a row of green, yellow and red indicator lights 82g, 82y and 82r located next to some graphical indicators 84 printed on console 70. The graphical indicator 84g next to the green indicator light 82g depicts a battery separated from an IC engine by a slash, the graphical indicator 84y next to the yellow indicator light 82y depicts a battery separated from an IC engine by an arrow with the arrow pointing from the battery to the IC engine, and the graphical indicator 84r next to the red indicator light 82r depicts a battery separated from an IC engine by an addition sign. Preferably, the graphical indicators 84 are printed on green, yellow and red bands in a manner similar to the indicator lights, i.e. the band of the graphical indicator 84g next to the green light 82g is also colored green, the band of the graphical indicator 84y next to the yellow light 82y is also colored yellow, etc.

In any event, during operation of mower 102, the state of charge of the battery pack is sensed by any appropriate means and reported to console 70. Any suitable logic and control means within console 70, i.e. a local microprocessor that may be part of the drive or cutting unit controllers or a separate microprocessor, will receive the sensed state of charge information and determine which light 82 to activate. If the battery pack is fully charged such that all battery operation would be appropriate, then the green indicator light 82g will be lit. If the battery pack is adequately but not fully charged such that all battery operation would be appropriate but that such battery operation will become impaired relatively soon, then the yellow indicator light 82y will be lit. If the battery pack is relatively discharged such that all battery operation would be inappropriate, then the red indicator light 82r will be lit.

The purpose of the indicator lights 82 is to let the operator know if it is permissible to enter into an all battery mode of operation. If the green light 82g is lit, the operator knows that he has plenty of capacity to conduct all battery operation and can use switch 74 to select the all battery mode with confidence. If the yellow light 82y is lit, the operator knows that he can enter and conduct some all battery operation, but that at some point he will have to switch the genset 143 back on as his time in the all battery mode is somewhat limited. If the red indicator light 82r is lit, the operator knows that he should not select the all battery mode of operation as he will have no or little time in which the battery pack can provide sufficient power to operate mower 102. In addition, a lock-out feature could be provided such that operation of mower 102 in its all battery mode is prohibited whenever the red indicator light 82r is lit. In this event, the operator would be compelled to start the genset 143 to operate mower 102.

The use of the graphical indicators 84 next to the indicator lights 82 is preferred since it serves to explain the meaning of the indicator lights to the operator. Obviously, graphical indicators 84 with a different arrangement of symbols meant to convey the same ideas could be used in place of the symbols shown in FIG. 4. In addition, with the graphical indicators 84 in place, it would not strictly be necessary for the lights 82 to be differently colored, though this is preferred. The indicators 84 themselves help explain the significance of the lights 82 so that the operator need only see which light 82 is lit and then look at the adjacent indicator 84 to explain the meaning. If no indicators 84 are used as would be possible, then the use of red, yellow and green lights 82 would be required.

Another desirable feature of console 70, and one which could be used even in a mower 2 with a "full time" genset, is a display indicating how much current is being drawn by each of the cutting reels. Such a display is shown at 90 in FIG. 4. The display includes a graphical representation 92 of each cutting unit and an adjacent horizontal indicator light or band 94, one for each reel, that functions like a thermometer, i.e. each band 94 will extend away from the cutting unit representation 92 by a distance proportional to the current draw such that the larger the current draw, the longer the band 94 and vise versa. The indicator bands 94 desirably also project through vertical green, yellow and red stripes 96g, 96y and 96r, respectively, with the green stripe 96g being nearest the representation 92 of the cutting unit, the yellow stripe 96y being next, and the red stripe 96r being furthest away from the cutting unit representation 92.

The current being drawn by the motor driving each reel can be monitored by the cutting unit controller 50 or 150 which information is used to activate the indicator bands 94. Thus, by glancing at the indicator bands 94, the operator will know the relative current usage of each cutting reel. If all of the indicator bands 94 for all of the reels are within the green vertical stripe 96g, the operator will know that the current draw from the reels is acceptable, indicating proper reel to bedknife adjustment on the cutting units. However, if the current draw for any one motor of any one reel becomes excessive, and the band 94 associated with that reel projects farther than the bands 94 associated with the other reels and enters either the yellow or red stripes 96y or 96r, the operator knows that the reel on this particular cutting unit is adjusted too tightly against the bedknife. Manual corrective action can then be taken to loosen the reel/bedknife adjustment until the band 94 for the affected cutting unit drops into a more normal range during future operation. Thus, by monitoring the display 90 and keeping the cutting units properly adjusted, undue current draw from the cutting units can be prevented.

While display 90 illustrates horizontally arranged indicator bands 94, the entire display 90 could be reoriented by 90° until the reel representations 92 are at the top and the indicator bands 94 extend vertically down away from the reel representations 92. This may be preferred since this arrangement more naturally mimics the configuration of the cutting units on the mower as the operator sits on the seat and looks at display 90.

Various automatic reel to bedknife adjustment systems are known for automatically controlling the reel to bedknife adjustment, such as shown in U.S. Pat. No. 4,335,569 to Keeney et al., which is incorporated herein by reference. If adjusters of the type shown in this patent were in place on the cutting units, the adjusters could be linked to the display 90 to loosen or control the preset adjustment in accordance with the sensed current draw. For example, as long as the indicator bands 94 are all in the green stripe 96g, the adjusters are left at their preset value with the reel to bedknife adjustment set to a relatively tight value. However, when the indicator bands 94 extend into the yellow or red stripes 96y or 96r, this is sensed and used to activate the adjusters to automatically loosen the reel to bedknife adjustment for the affected reel until the band 94 drops back into the green stripe 96g. Thus, the sensed current draw that forms the basis of display 90 would be used to automatically control the reel to bedknife adjusters to keep all the indicator bands 94 at a desired level, e.g. preferably within green stripe 96g.

Another way of using an automatic reel to bedknife system would be to allow the system to normally maintain the reel to bedknife adjustment at a desired preset value. Then, whenever the operator activates switch 74 to place the mower into its all battery mode of operation, this would be sensed and the reel to bedknife adjustment for all the cutting reels would be automatically loosened by a predetermined amount from its preset value. In other words, placing the mower into all battery operation would automatically loosen the reel to bedknife adjustment on the reels to thereby decrease the current draw. When the operator goes back to combined genset/battery operation by flipping switch 74 back toward the IC engine symbol 78, the reel to bedknife adjustment system would then automatically reestablish the preset value for the reel to bedknife adjustment on all the cutting reels.

The Drive System of FIG. 5

FIG. 5 illustrates a slightly different drive system that may be used with either of the mowers shown in FIG. 1 or 3 in place of the drive system of FIG. 2. In the FIG. 5 drive system, the single DC motor controller 50 of FIG. 2 has been replaced with dual DC motor controllers 50a and 50b. Motor controller 50a is connected to electric motor 18 for traction wheel 6a, while motor controller 50b is similarly connected to electric motor 18 for traction wheel 6b. Motor controllers 50a and 50b control the application of 48 Volt electrical power from genset 43 and battery pack 44. Each motor controller 50a and 50b can comprise a Curtis PMC controller.

In the drive system of FIG. 5, the operational inputs from steering wheel 14, traction pedal 13, and the like no longer go directly to motor controllers 50a or 50b. Instead, another microprocessor based, master electronic controller 51 is used to receive the operational inputs and to then in turn control the motor controllers 50a and 50b along with the cutting unit controller 60 and other machine components. Preferably, master electronic controller 51 is powered separately by its own 12 V battery power source 53, which power source may also be recharged by the operation of genset 43.

It should be apparent that the FIG. 5 drive system will work quite similarly to that of FIG. 2. When the operator commands forward or reverse motion through traction pedal 13, this is sensed by master controller 51 which then commands the motor controllers 50a and 50b to apply power to traction motors 18 in just the right amounts and in the right polarity to achieve forward or reverse direction of mower 2. Ground speed feedback from one or both of the traction motors 18 can be applied in a closed loop fashion back to master controller 51 or by IR feedback directly to each controller 50*a* and 50*b*. Similarly, a turn can be sensed by controller 51 from the position of steering wheel 14, and the controller 51 will then command the motor controllers 50*a* and 50*b* to vary the speed of the motors 18 to achieve a differential effect in the turn.

Use of a separate master electronic controller 51 provides mower 2 with many possible sophisticated control features. For example, a seat switch can be installed under the seat 10 on which the operator sits to determine the presence of the operator on the seat. If the seat is empty, then controller 51 can disable operation of the motor controllers 50*a* and 50*b* and motors 18 even if the traction pedal 13 is inadvertently depressed.

Figure 6:
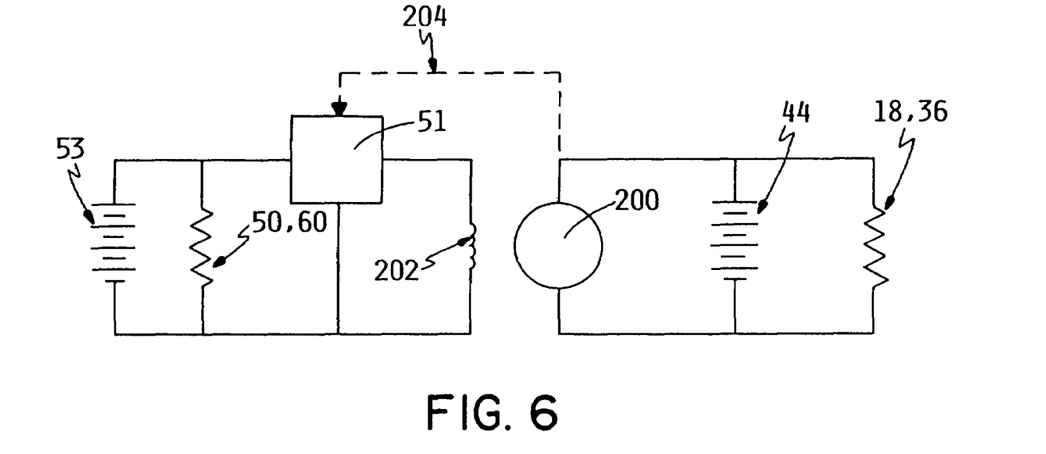
FIG. 6 is a schematic view of a internal combustion engine/ generator combination or "genset" that may be used in the drive system of this invention.

The Genset of FIG. 6

While DC gensets 43 are commercially available from many sources, direct current models are relatively expensive to purchase. FIG. 6 illustrates a DC genset of the Applicants' own design which can be assembled relatively inexpensively.

Referring now to FIG. 6, the master electronic controller 51 powered by its own 12 V battery power source 53 is illustrated. A 48 Volt truck alternator 200 is used as the electrical current generating portion of the genset. Such truck alternators 200 are relatively inexpensive and easily available.

The magnetic field windings 202 of alternator 200 are controlled by a variable 0-12 Volt signal from controller 51. Controller 51 is used to control the output of alternator 200 in accordance with the voltage in the 48 Volt system used to power the mower traction drive and cutting units. As the system voltage drops below the 48 Volt nominal full power value due to loads imposed on the system or as battery pack 44 is discharged, this voltage drop is sensed by controller 51 along the input line 204. Controller 51 then controls the magnetic field windings 202 of alternator 200 to allow alternator 200 to begin supplying enough power to the drive system to maintain the desired voltage in the drive system. Thus, controller 51 also serves as the voltage regulator of the genset and allows an inexpensive truck alternator 200 to be controlled with the 12 Volt control voltage available to controller 51 to avoid having to purchase a commercial DC genset.

Figure 7:
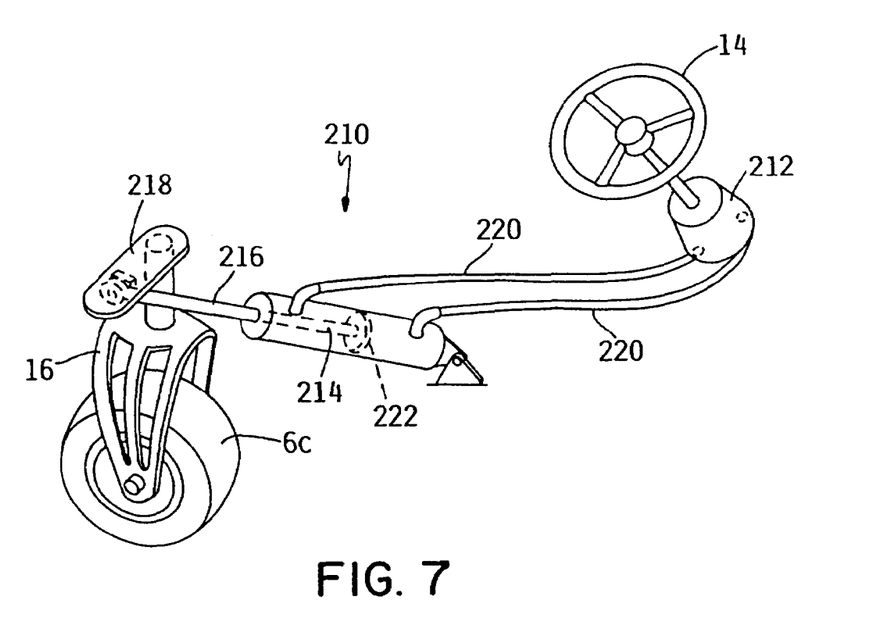
FIG. 7 is a perspective view of a steering system that can be used with a vehicle equipped with the drive system of this invention.

The Steering System of FIG. 7

Referring to FIG. 7, a steering system 210 for mower 2 or 102 is shown which comprises a closed fluid containing system preferably using a non-toxic, bio-degradable oil, such as Canola oil. A first rotary pump 212 is linked to steering wheel 14 or 114. Pump 212 preferably comprises a Teleflex HH5762 Seastar 2.4 Helm unit of the type used for the steering of boats. A second linear cylinder 214 has its piston rod 216 linked to some linkage 218 for effecting steering of the pivotal yoke 16 or 116 carrying the steerable wheel 6*c* or 116*c* of mower 2 or 102. Cylinder 214 preferably comprises a Teleflex HC5314 cylinder.

Two hoses 220 lead from pump 212 to opposite ends of second cylinder 214 with the whole system being filled with a suitable oil, preferably a non-toxic, bio-degradable oil. As the operator turns steering wheel 14 or 114, his muscles provide the power to pump fluid out of one side or the other of pump 212, depending on the direction of the turn. This causes a corresponding movement of the piston 222 in the second cylinder 214, and hence a turning of the steerable wheel by pivoting the yoke.

The advantage of using this type of steering system 210 in mower 2 or 102 is that it avoids the need for having a power operated pump that pumps a more conventional oil from a reservoir for power steering purposes. Such a power operated pump and oil become hot. The hot oil will damage the turf if a leak develops. However, using a steering system 210 which avoids the use of a powered pump which heats the oil, means that the non-toxic oil contained in system 210 will remain at or close to ambient temperature and will not damage the turf even if a leak develops in system 210. This is a major advantage. In addition, system 210 is easy to fit on mower 2 or 102 since the flexible hoses 220 can be easily routed from steering wheel 14 or 114 to steerable wheel 6*c* or 106*c* in a manner that is not true of rigid mechanical linkages.

The steering system 210 described herein can be used on any turf maintenance vehicle for the same reasons pertaining to its use in mower 2 or 102, namely to avoid damaging the turf in the event of a leak. Accordingly, steering system 210 is not limited for use with a mower 2 or 102 having electrically driven cutting reels or an electric traction drive system. However, steering system 210 does have particular applicability to a vehicle such as the mowers 2 or 102 disclosed herein which avoid using conventional hydraulic systems for either powering the mower itself or the cutting units. Steering system 210 further adds to the environmentally friendly nature of such a mower.

Figure 8:
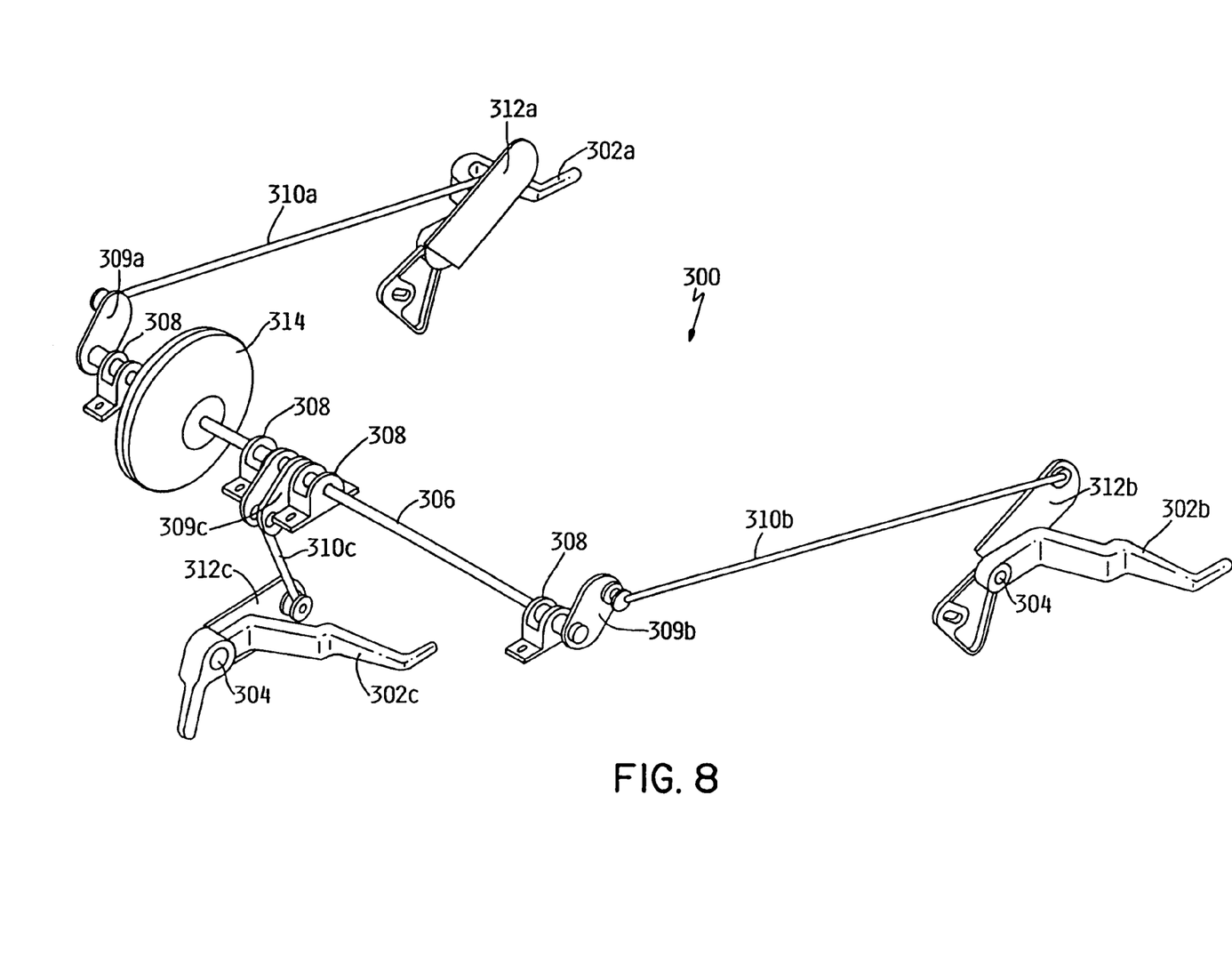
FIG. 8 is a perspective view of a lift and lower system for the turf maintenance operating units carried on the vehicles shown in FIG. 1 or FIG. 3.
Figure 9:
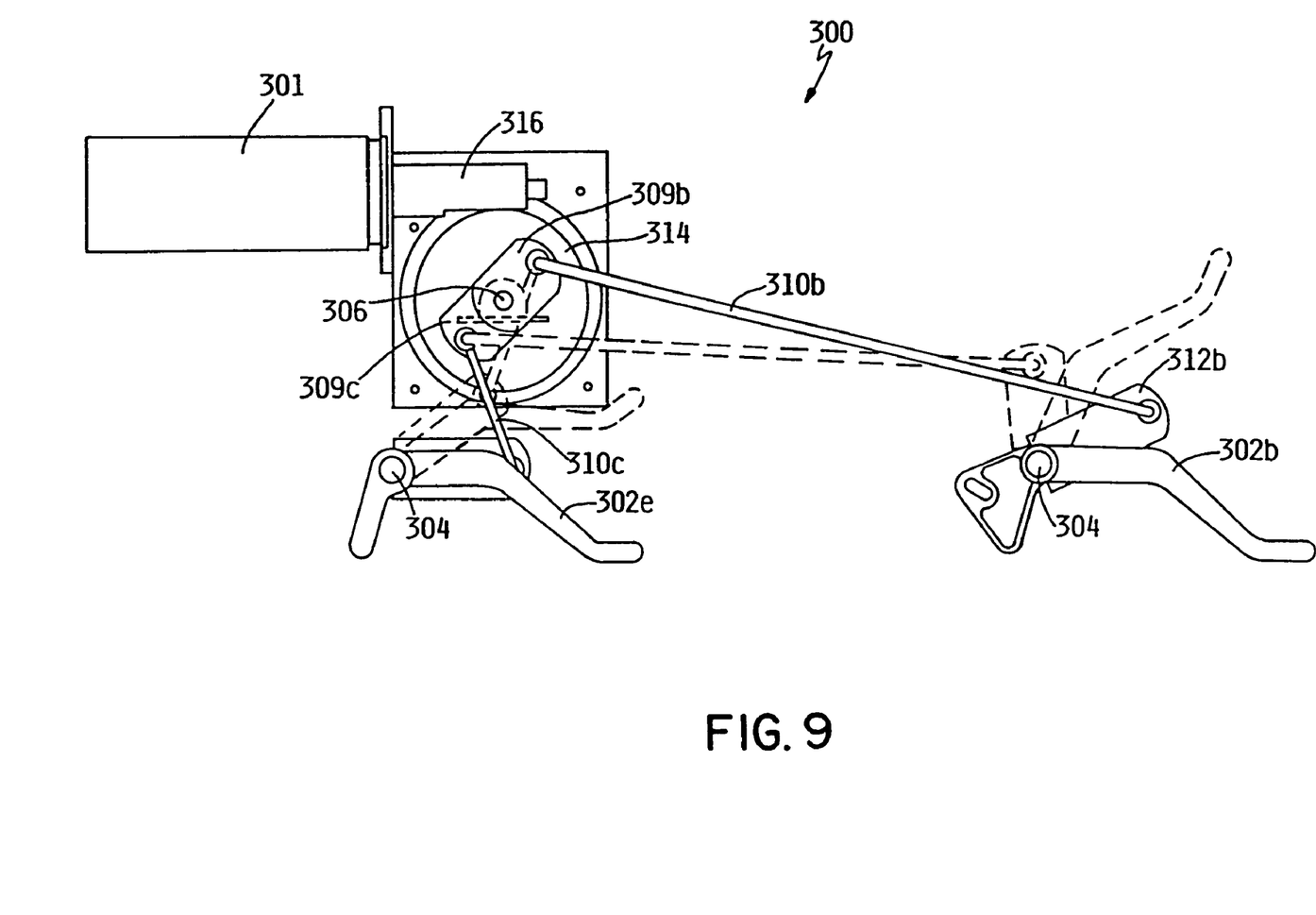
FIG. 9 is a side elevational view of the lift and lower system of FIG. 8.

The Lift and Lower System of FIGS. 8 and 9

FIGS. 8 and 9 illustrate a lift and lower system 300 for raising and lowering the cutting units 30 of mower 2 or 102. Lift and lower system 300 accomplishes this task using only a single electric drive motor 301 and a novel linkage between motor 301 and cutting units 30. This linkage allows cutting units 30 to raise and lower in a timed sequence—some cutting units 30 will raise and/or lower before others. System 300 is simple and durable.

A lift arm 302 rotatable about a horizontal axis 304 is normally provided for each cutting unit 30 as part of mower 2 or 102. Lift arm 302 engages beneath a portion of suspension 34 to lift upwardly on suspension 34, and hence on the cutting unit, when lift arm 302 rotates about horizontal axis 304. One such lift arm 302*a* for cutting unit 30*a* is shown in FIG. 1, but there is a similar lift arm 302 for each cutting unit. Typically, it is desired that the two front cutting units 30*a* and 30*b* lift before the center cutting unit 30*c*. The same timing relationship is also true for lowering. The two front cutting units 30*a* and 30*b* desirably lower before center cutting unit 30*c* lowers.

Lift and lower system 300 includes a single rotatable crankshaft 306 mounted by bearings 308 to some portion of mower 2 or 102. Crankshaft 306 includes a plurality of crankarms 309*a*, 309*b* and 309*c* which are connected to one end of connecting rods 310*a*, 310*b* and 310*c*, respectively. The other end of the connecting rods are connected to links 312*a*, 312*b* and 312*c* carried on lift arms 302 of cutting units 30*a*, 30*b* and 30*c*, respectively. The crankarm and connecting rod linkages to the two front cutting units 30*a* and 30*b* are identically connected to crankshaft 306 so that these two cutting units will lift and lower together. The crankarm and connecting rod linkage to the center cutting unit 30*c* is different so that the lifting and lowering of this cutting unit is timed to occur at different times than that of the front cutting units 30*a* and 30*b*.

A means is provided for rotating crankshaft 306 in discrete amounts of rotation, preferably in 180° increments. This means includes a drive wheel 314 mounted on crankshaft 306. Drive wheel 306 is engaged by a worm 316 that is rotated by a single electric drive motor 301. Drive motor 301 is designed to rotate worm 316 and drive wheel 314 to rotate crankshaft 306 in a first increment of rotation to raise cutting units 30, i.e.

from 0 to 180°, and to then subsequently rotate crankshaft 306 in a second increment of rotation to lower cutting units 30, i.e. from 180 to 360°.

Referring now to FIG. 9, the operation of lift and lower system 300 is illustrated by the solid and phantom lines of the components. The components are shown in solid lines in the position they would have when cutting units 30 are lowered onto the ground. The components are shown in phantom lines in the position they would have when cutting units 30 have been raised from the ground for the purpose of transport or the like.

If it is desired to raise cutting units 30 from their lowered position shown in solid lines, crankshaft 306 is rotated counter-clockwise 180° by motor 301, worm 316 and drive wheel 314. During the initial portion of this increment of rotation, the connecting rods 310a and 310b to the two front cutting units almost immediately begin to rise due to where they connect to their respective crankarms 309a and 309b and the orientation of these crankarms on crankshaft 306. Thus, the lift arms 302 for the two front cutting units begin to rotate counter-clockwise quite soon during the initial portion of this increment of rotation of crankshaft 306 to raise the two front cutting units. However, in this initial portion of this increment of rotation, the connecting rod 310c to the center cutting unit first dips down and then translates horizontally before beginning to rise because of its different crankarm geometry. Thus, as crankshaft 306 rotates from 0 to 180°, the two front cutting units 30a and 30b are raised first and then the center cutting unit 30c follows until the components reach their phantom line positions shown in FIG. 9.

The lowering of cutting units 30 works similarly. As crankshaft 306 rotates from 180° to 360°, the first portion of this second increment of rotation causes the front cutting units 30a and 30b to begin to lower before the center cutting unit 30c. Thus, cutting units 30 raise and lower in a properly timed relationship simply by virtue of their different crankarm geometries relative to crankshaft 306.

The use of a single drive motor 301 rotating a single crankshaft 306 to lift and lower all cutting units 30 has numerous advantages. It has far fewer components than when using a separate electrical actuators or motor for each cutting unit. Obviously, in system 300 there is only one drive motor instead of three. In addition, fewer limit switches and the like are needed in system 300. Accordingly, lift and lower system 300 is simpler and less expensive than many other similar systems known in the art.

While mower 2 has been illustrated as a riding mower herein, it is obvious that the principles thereof can be applied to walk behind mowers as well. Moreover, cutting units 30 can have other forms than that shown herein, e.g. cutting units having rotary blades. In addition, the principles of this invention can be applied to turf maintenance vehicles other than mowers or to turf maintenance operating units other than cutting units. For example, the lift and lower system 300 shown in FIGS. 8 and 9 can be used to lift and lower other types of turf maintenance operating units carried on a vehicle, such as other turf cutters, sand trap rakes, or grooming, thatching or rolling implements. Accordingly, the scope of this invention is to be limited only by the appended claims.

We claim:

1. An electrically driven turf maintenance machine, which comprises:
  (a) a frame;
  (b) a plurality of ground engaging wheels attached to the frame for supporting the frame for movement over the ground;
  (c) at least one electric motor operatively connected to at least one of the ground engaging wheels for propelling the wheel to provide traction for the frame;
  (d) a plurality of reel cutting units carried on the frame for mowing grass, wherein each reel cutting unit comprises a rotatable cutting reel that sweeps grass against a sharpened bedknife for cutting the grass;
  (e) a plurality of electric motors for driving the plurality of reel cutting units with at least one electric motor being carried on each reel cutting unit for powering the rotatable cutting reel of each reel cutting unit; and
  (f) an electric drive system carried on the frame for providing electric power to the electric motors, the electric drive system comprising:
    (i) an internal combustion engine;
    (ii) an electric power generating device mechanically driven by the engine for supplying electric power;
    (iii) a battery power source for supplying electric power, wherein the electric power generating device is connected to the battery power source to recharge the battery power source during operation of the internal combustion engine;
    (iv) an electric power supply circuit connected to the electric motors to supply electric power to the electric motors at least from either the electric power generating device or from both the electric power generating device and battery power source;
    (v) a switch for shutting off the internal combustion engine to thereby disable the electric power generating device, thereby making the battery power source the sole source of electric power for the electric motors, wherein the switch is selectively operable only under the manual control of a user of the machine to allow only the user to select when the battery power source shall serve as the sole source of electric power for the electric motors;
    (vi) a display for indicating to a user of the machine different states of charge of the battery power source, wherein the display has a warning indicator that warns the user when the battery has been discharged to a state of charge that is between a substantially fully charged state of charge and a predetermined minimum state of charge to alert the user to a need to recharge the battery by restarting the internal combustion engine if the user so desires; and
    (vii) automatically operable lock-out means for preventing operation of the electric motors from only the battery power source when the user operates with the battery power source serving as the sole source of electric power and the state of charge of the battery power source reaches the predetermined minimum level, wherein the lock-out means only prevents operation of the electric motors without the lock-out means automatically restarting the engine such that restarting the engine remains solely under the manual control of the user with the user being required to selectively restart the internal combustion engine at a time solely of the user's choosing to permit continued operation of the electric motors.

2. A machine as recited in claim 1, wherein the electric power generating device comprises an alternator.

3. A machine as recited in claim 2, further including a controller for controlling the application of electric power to the electric motors, and wherein the controller is further connected to the magnetic field windings of the alternator to control the operation of the alternator.

4. A machine as recited in claim 1, wherein two of the wheels on the frame are individually driven by separate electric motors each of which are connected to the electric drive system.

5. A machine as recited in claim 4, wherein the machine has a steering wheel to allow the machine to be turned, and further including a controller for controlling the supply of electric power from the electric drive system to the electric motors, wherein the controller has means responsive to a turn effected by movement of the steering wheel to vary the power supplied to the individual electric motors to effect a differential action during the turn.

6. A turf maintenance machine, which comprises:
(a) a movable frame;
(b) at least one electrically powered cutting unit carried on the frame for cutting grass;
(c) an electrically powered traction system for propelling the frame; and
(d) a drive system carried on the frame for powering the cutting unit and the traction system, the drive system including:
   (i) an internal combustion engine that powers an electric power generating device that at least at various times partially supplies electrical energy to the cutting unit and the traction system during a hybrid mode of operation;
   (ii) a battery power source that also at least at various times partially supplies electrical energy to the cutting unit and the traction system during the hybrid mode of operation and that entirely supplies electrical energy to the cutting unit and the traction system during an all battery mode of operation; and
   (iii) a selectively actuable switch having two positions for selecting between the hybrid and all battery modes of operation with the switch in one position thereof deactivating the engine to enter the all battery mode of operation and the switch in the other position activating the engine to enter the hybrid mode of operation, wherein the switch is selectively actuable only by manual control by a user of the machine such that only the user is able to switch back and forth between the hybrid and all battery modes of operation by the user manually moving the switch back and forth between the two positions thereof.

7. A machine as recited in claim 6, wherein the placement of the switch into the position that selects the all battery mode of operation shuts off the internal combustion engine to prevent the internal combustion engine from powering the electric power generating device.

8. An electrically driven turf maintenance machine, which comprises:
(a) a frame;
(b) a plurality of ground engaging wheels attached to the frame for supporting the frame for movement over the ground;
(c) at least one electric motor operatively connected to at least one of the ground engaging wheels for propelling the wheel to provide traction for the frame;
(d) a plurality of reel cutting units carried on the frame for mowing grass, wherein each reel cutting unit comprises a rotatable cutting reel that sweeps grass against a sharpened bedknife for cutting the grass, wherein the reel cutting units are disposed in a predetermined side-to-side distribution and front-to-back distribution of cutting units in a ganged configuration relative to the frame;
(e) a plurality of electric motors for driving the plurality of reel cutting units with at least one electric motor being carried on each reel cutting unit for powering the rotatable cutting reel of each reel cutting unit; and
(f) an electric drive system carried on the frame for providing electric power to the electric motors, the electric drive system comprising:
   (i) an internal combustion engine;
   (ii) an electric power generating device mechanically driven by the engine for supplying the electric power;
   (iii) a battery power source for supplying the electric power; and
   (iv) a display having a plurality of current draw indicators for the motors powering the reel cutting units so that the current draw from each reel cutting unit is displayed to an operator of the mower, wherein the display includes a plurality of pictorial symbols with each symbol representing one of the reel cutting units carried on the frame and with the symbols being collectively arranged on the display in a pictorial symbol arrangement that mimics the ganged configuration of the reel cutting units on the frame with some symbols being ahead of other symbols to mimic the front to back distribution of cutting units in the ganged configuration and with some symbols being displaced to the side of other symbols to mimic the side to side distribution on cutting units in the ganged configuration, and wherein the current draw indicator for the motor of a particular cutting unit is arranged adjacent the symbol that represents the particular cutting unit in the pictorial arrangement of cutting units on the display.

9. The machine of claim 8, wherein the current draw indicators each comprise a variable length band whose length is related to the current draw with the band being longer when the current draw is higher and shorter when the current draw is lower.

10. An electrically driven turf maintenance machine, which comprises:
(a) a frame;
(b) a plurality of ground engaging wheels attached to the frame for supporting the frame for movement over the ground;
(c) at least one electric motor operatively connected to at least one of the ground engaging wheels for propelling the wheel to provide traction for the frame;
(d) a plurality of reel cutting units carried on the frame for mowing grass, wherein each reel cutting unit comprises a rotatable cutting reel that sweeps grass against a sharpened bedknife for cutting the grass;
(e) a plurality of electric motors for driving the plurality of reel cutting units with at least one electric motor being carried on each reel cutting unit for powering the rotatable cutting reel of each reel cutting unit; and
(f) an electric drive system carried on the frame for providing electric power to the electric motors, the electric drive system comprising:
   (i) an internal combustion engine;
   (ii) an electric power generating device mechanically driven by the engine for supplying electric power;
   (iii) a battery power source for supplying electric power;
   (iv) an electric power supply circuit connected to the electric motors to supply electric power to the electric motors at least from either the electric power generating device or from both the electric power generating device and battery power source; and (v) a switch for shutting off the internal combustion engine to thereby disable the electric power generating device, thereby making the battery power source the sole source of electric power for the electric motors, wherein the switch is selectively operable under the control of a user of the machine to allow the user to select when the battery power source shall serve as the sole source of electric power for the electric motors; and (vi) an automatic reel to bedknife adjustment system that is activated to loosen the reel to bedknife adjustments on the reel cutting units whenever the shut off switch is operated by the user enter into an all battery mode of operation.

* * * * *